(12) United States Patent
Honbo et al.

(10) Patent No.: US 6,399,251 B1
(45) Date of Patent: Jun. 4, 2002

(54) LITHIUM SECONDARY BATTERY

(75) Inventors: Kyoko Honbo, Hitachinaka; Masahiro Kasai, Mito; Akihiro Gotoh; Yoshiji Hotta, both of Hitachi, all of (JP)

(73) Assignees: Hitachi, Ltd.; Shin-Kobe Electric Machinery Co., Ltd., both of Tokyo (JP)

( * ) Notice: Subject to any disclaimer, the term of this patent is extended or adjusted under 35 U.S.C. 154(b) by 0 days.

(21) Appl. No.: 09/558,103

(22) Filed: Apr. 25, 2000

(30) Foreign Application Priority Data

Apr. 27, 1999 (JP) .......................... 11-119537

(51) Int. Cl.[7] .............................. H01M 4/58
(52) U.S. Cl. .................. 429/231.95; 429/231.8
(58) Field of Search ............... 429/231.95, 231.1, 429/218.1, 231.4, 231.8

(56) References Cited

U.S. PATENT DOCUMENTS

| | | | |
|---|---|---|---|
| 5,759,719 A | * 6/1998 | Mao | 429/223 |
| 5,807,646 A | * 9/1998 | Iwata et al. | 264/603 |
| 5,820,790 A | * 10/1998 | Amine et al. | 252/519.1 |
| 5,869,208 A | * 2/1999 | Miyasaka | 429/215 |
| 6,001,139 A | * 12/1999 | Asanuma et al. | 29/623.3 |
| 6,030,726 A | * 2/2000 | Takeuchi et al. | 429/231.8 |
| 6,071,489 A | * 6/2000 | Sun et al. | 423/594 |
| 6,203,942 B1 | * 3/2001 | Gan et al. | 429/203 |

FOREIGN PATENT DOCUMENTS

| | | | |
|---|---|---|---|
| EP | 1049187 A2 | * | 11/2000 |
| JP | 6-187993 | | 7/1994 |
| JP | 7-282798 | | 10/1995 |
| JP | 8-24043 | | 3/1996 |
| JP | 10-116615 A | * | 5/1998 |
| JP | 2000-58057 A | * | 2/2000 |
| JP | 2000-067864 A | * | 3/2000 |

* cited by examiner

Primary Examiner—Tom Dunn
Assistant Examiner—Lynne Renee Edmondson
(74) Attorney, Agent, or Firm—Antonelli, Terry, Stout & Kraus, LLP (57) ABSTRACT

A lithium secondary battery having a longer life than conventional battery at a high temperature for electric power storage and electric vehicles is obtained. A lithium secondary battery having a long life at a high temperature can be obtained by using a material specified in Li/Mn atomic ratio, lattice constant, half value width, specific surface area, and average primary particle size as the positive electrode active material; and a material specified in density.

9 Claims, 7 Drawing Sheets

LITHIUM SECONDARY BATTERY

BACKGROUND OF THE INVENTION

The present invention relates to lithium secondary batteries.

Currently, decreasing carbon dioxide, suppression of energy consumption, and the like are strongly required in view of environmental requirement. Accordingly, electric power storage systems, electric vehicles, and the like are receiving attention as new environmental technology. Lithium secondary batteries using non-aqueous electrolyte have been developed remarkably, because of their high battery voltage and high energy density, and the lithium secondary batteries are practically used for information apparatus such as computers, portable telephones, and the like.

However, because industrial batteries of high input, high output, and a large capacity require a large amount of active material, Co group materials and Ni group materials, which have been used for the information apparatus, can not be used practically for the industrial batteries in view of cost and resources. Therefore, spinel type Mn group materials are expected to solve these problems. However, the spinel type Mn group materials had problems such as low cycle life at high temperature, which is the most important issue for the industrial batteries, undesirable output characteristics, and undesirable input characteristics.

In order to apply the lithium secondary battery as power sources for electric vehicles, parallel hybrid electric vehicles, electric power storage systems, elevators, electric tools, and the like, a life at least 1000 cycles (at least 70% of capacity maintaining rate) at a high temperature higher than 50° C., and an output power at least 500 W/kg are required for the lithium secondary batteries. However, conventional Mn group materials could not achieve such a long life nor high output power density.

Hitherto, many trials for extending the life have been performed. For instance, in accordance with JP-A-6-187993 (1994), extension of the life by increasing a composition ratio of Li and Mn, i.e. Li/Mn ratio, has been tried. However, decreasing its capacity of approximately several per cent was occurred after only 10 cycles of charge-discharge cycle even at room temperature. The cycle life of the lithium secondary battery is significantly influenced by environmental temperature, and, in particular, the life is remarkably shortened at a high temperature higher than 50° C. Accordingly, it is difficult to obtain the cycle life longer than 1000 cycles at a high temperature higher than 50° C. by only increasing the Li/Mn ratio.

In accordance with JP-B-8-24043 (1996), the extension of life has been tried by increasing the Li/Mn ratio similarly, and calcining the material at a temperature in the range of 430–510° C. so as to obtain a material having a lattice constant smaller than 8.22 Å. However, only a life of approximately 200 cycles at room temperature could be obtained, and any prospect to obtain a cycle life of at least 1000 cycles at a high temperature higher than 50° C. could not be obtained. In accordance with JP-A-7-282798 (1995), the extension of life has been tried by using a material having a large Li/Mn ratio, i.e. Li[$Mn_{2-x}Li_x$]$O_4$ (0.020≦x≦0.081). However, in a case when x was made 0.081 (Li/Mn ratio=0.58), decreasing the capacity of 5% was observed even in room temperature after approximately 100 cycles, and the cycle life longer than 1000 cycles could not be expected at a high temperature higher than 50° C.

The reason of short cycle life is in disintegration of crystals of the positive electrode active material by repeating expansion and shrinkage of the positive electrode active material with plural cycles of charging and discharging operations, which makes it prohibit reversal absorption and desorption of lithium. Additionally, Mn ions are readily dissolved into the electrolyte at a high temperature, and the crystal of the positive electrode active material is more readily disintegrated than at room temperature. The dissolved ions are precipitated on the negative electrode, the charge and discharge reactions at the negative electrode is disturbed, and the life of the negative electrode is shortened.

The reason of low output characteristics, and low input characteristics with the lithium secondary battery is in low diffusion velocity relating to intercalation and deintercalation of lithium ions, because an organic solvent having a lower ion conductivity than aqueous solution is used as the electrolyte. In particular, a coating film is generated at the surface of the negative electrode by a reaction of the lithium ions, which are isolated by the presence of excessive amount of lithium ions for the reaction at the surface of the negative electrode, with the organic electrolyte, and the diffusion velocity of the lithium ions are further decreased by the presence of the coating film to make the output characteristics and the input characteristics worse. The ion conductivity of the organic solvent, i.e. the electrolyte, is decreased significantly at a low temperature, and the output characteristics and the input characteristics are getting further worse.

SUMMARY OF THE INVENTION

One of the objects of the present invention is to solve the above problems, and to provide a lithium secondary battery having a long life by using materials of long life at a high temperature, which is capable of receiving or supplying electric power rapidly corresponding to variation in power sources and power demands.

In accordance with the lithium secondary battery of the present invention, a material containing amorphous carbon is used for the negative electrode, and a complex oxide containing Li and Mn, which has a spinel type crystalline structure, is used for the positive electrode.

The complex oxide as the positive electrode of the present invention necessitates Li and Mn as indispensable elements, but a small amount of other elements such as transient element other than Mn, and elements in IIa group and IIIb group can be contained. For instance, these elements are Ti, V, Cr, Fe, Co, Ni, Cu, Zn, Be, Mg, Ca, Sr, Ba, Ra, B, Al, Ga, In, Ti, and the like. Hereinafter structures of the positive electrode and the negative electrode are explained in details.

The positive electrode active material of the present invention is characterized in Li/Mn atomic ratio of the complex oxide in the range of larger than 0.55 and smaller than 0.80. When the Li/Mn atomic ratio is equal to or smaller than 0.55, the cycle life is short, because Mn ions are dissolved into the electrolyte and the crystalline structure of the complex oxide is disintegrated by repeating the charge and discharge cycles at a temperature higher than 50° C. When the Li/Mn atomic ratio is equal to or larger than 0.80, the discharging capacity is small, and an objective lithium secondary battery for mounting on power sources of electric vehicles, parallel hybrid electric vehicles, electric power storage systems, elevators, electric tools, and the like can not be obtained.

The spinel type crystalline of the complex oxide of the present invention is characterized in its lattice constant in the range larger than 8.031 Å and smaller than 8.230 Å. If the lattice constant is larger than 8.230 Å, the cycle life is short, because Mn ions are dissolved into the electrolyte and the crystalline structure of the complex oxide is disintegrated by repeating the charge and discharge cycles at a temperature higher than 50° C. If the lattice constant is smaller than 8.031 Å, the discharging capacity is small, and an objective lithium secondary battery for mounting on power sources of electric vehicles, parallel hybrid electric vehicles, electric power storage systems, elevators, electric tools, and the like can not be obtained.

The crystalline of the complex oxide of the present invention is further characterized in its half value width of 2θ angle at (400) peak in the x-ray diffraction pattern in the range smaller than 0.20°. In the measurement of the x-ray diffraction pattern, the Cu-k$_\alpha$ ray was used as the radiation source, and a slit having a slit width of DS=SS=0.5, RS=0.15 was used. If the half value width is equal to or larger than 0.20°, the cycle life is short, because Mn ions are dissolved into the electrolyte and the crystalline structure of the complex oxide is disintegrated by repeating the charge and discharge cycles at a temperature higher than 50° C.

The complex oxide of the present invention is further characterized in its specific surface of secondary particles of the complex oxide in the range smaller than 1.5 m$^2$/g and larger than 0.10 m$^2$/g. If the specific surface is larger than 1.5 m$^2$/g, the cycle life is short, because Mn ions are dissolved into the electrolyte and the crystalline structure of the complex oxide is disintegrated by repeating the charge and discharge cycles at a temperature higher than 50° C. If the specific surface is smaller than 0.10 m$^2$/g, the power efficiency in quick charging and quick discharging is low, because the reaction field of the electrode active material itself is small, and an objective lithium secondary battery for mounting on power sources of electric vehicles, parallel hybrid electric vehicles, electric power storage systems, elevators, electric tools, and the like can not be obtained.

The complex oxide of the present invention is further characterized in its average particle diameter of primary particles of the complex oxide in the range larger than 1 μm and smaller than 20 μm. If the average particle diameter is smaller than 1 μm, the cycle life is short, because Mn ions are dissolved into the electrolyte and the crystalline structure of the complex oxide is disintegrated by repeating the charge and discharge cycles at a temperature higher than 50° C. If the average particle diameter is larger than 20 μm, the power efficiency in quick charging and quick discharging is low, because the reaction field of the electrode active material itself is small, and an objective lithium secondary battery for mounting on power sources of electric vehicles, parallel hybrid electric vehicles, electric power storage systems, elevators, electric tools, and the like can not be obtained.

The positive electrode of the present invention can be used for obtaining the objective lithium secondary battery; which has a long life at a high temperature, and can be mounted on power sources of electric vehicles, electric power storage systems, elevators, electric tools, and the like; by only forming a combination with a negative electrode containing amorphous carbon. The negative electrode active material of the lithium secondary battery of the present invention is characterized in containing amorphous carbon, and in its negative electrode density in the range larger than 0.95 g/cm$^3$, and smaller than 1.5 g/cm$^3$.

When the charge and discharge cycles is repeated at a temperature higher than 50° C., Mn ions are dissolved into the electrolyte from the positive electrode active material, and Mn is precipitated at a portion, the potential of which becomes lower than the Mn ion precipitation starting potential, i.e. 2 V. The precipitated portions are such as the negative electrode, separator, electricity collecting foil, battery can, and the like. If the negative electrode density is smaller than 0.95 g/cm$^3$, vacancies in the negative electrode are numerous and the specific surface area as the electrode is large. Accordingly, a large amount of Mn is precipitated on the surface and inside of the negative electrode. The precipitated Mn decreases the capacity of the negative electrode significantly, and makes the cycle life short. If the negative electrode density is larger than 1.5 g/cm$^3$, the vacancy in the negative electrode is too small to make the electrolyte penetrate into the inside of the electrode. Therefore, the capacity of the negative electrode is decreased significantly, and the objective lithium secondary battery for mounting on power sources of electric vehicles, parallel hybrid electric vehicles, electric power storage systems, elevators, electric tools, and the like can not be obtained.

The negative electrode active material of the lithium secondary battery of the present invention is further characterized in containing amorphous carbon, and in its true density in the range of 1.2 g/cm$^3$–1.8 g/cm$^3$. When the charge and discharge cycles is repeated at a temperature higher than 50° C., Mn ions are dissolved into the electrolyte from the positive electrode active material, and Mn is precipitated at a portion, the potential of which becomes lower than the Mn ion precipitation starting potential, i.e. 2 V. The precipitated portions are such as the negative electrode, separator, electricity collecting foil, battery can, and the like. If the true density of the amorphous carbon is smaller than 1.2 g/cm$^3$, vacancies in the carbon are numerous and the specific surface area is large. Accordingly, a large amount of Mn is precipitated on the surface and inside of the carbon. The precipitated Mn decreases the capacity of the negative electrode significantly, and makes the cycle life short. If the true density of the amorphous carbon is larger than 1.8 g/cm$^3$, the vacancy in the negative electrode is too small to make the electrolyte penetrate into the inside of the electrode. Therefore, the capacity of the negative electrode is decreased significantly, and the objective lithium secondary battery for mounting on power sources of electric vehicles, parallel hybrid electric vehicles, electric power storage systems, elevators, electric tools, and the like can not be obtained.

The negative electrode active material of the lithium secondary battery of the present invention is further characterized in containing amorphous carbon and in its crystalline thickness Lc in the range of 5 Å–150 Å. The crystalline thickness Lc is one of the indexes indicating crystallinity of the carbon, that is, a small Lc indicates a strong amorphous property, and a large Lc indicates a strong graphitized property. The Lc is also an index indicating the number of laminated layers in a direction perpendicular to the six members ring network plane. A small Lc means a small number of the laminated layers, and further means a small number of intercalating—deintercalating sites for lithium, i.e. the end portions of the six members ring. On the contrary, a large Lc means a large number of the laminated layers, and further means a large number of intercalating—deintercalating sites for lithium, i.e. the end portions of the six members ring. If crystalline thickness Lc of carbon is smaller than 5 Å, the intercalating—deintercalating reaction is not proceeded smoothly, because the intercalating deintercalating sites for lithium is not ensured. Therefore, output characteristics and input characteristics are significantly deteriorated, because a condition wherein the lithium ions are strongly trapped in carbon is maintained. If crystalline thickness Lc of carbon is larger than 150 Å, the properties as graphite becomes stronger than the amorphous properties, the six members ring network planes are laminated in parallel each other, and the end portion of the six members ring is concentrated in a direction. Therefore, the intercalating—deintercalating sites for lithium is oriented in the direction, and the intercalating—deintercalating reaction of lithium is proceeded only in a direction. Accordingly, the output characteristics and the input characteristics are significantly deteriorated. As the results, the objective lithium secondary battery for mounting on power sources of electric vehicles, parallel hybrid electric vehicles, electric power storage systems, elevators, electric tools, and the like can not be obtained.

The lithium secondary battery of the present invention is featured in obtaining an input density in the range of 300 W/kg–1800 W/kg per unit battery. Furthermore, the lithium secondary battery of the present invention is featured in obtaining an output density in the range of 500 W/kg–3500 W/kg per unit battery. The battery can be used in the same range as the output density. The power source which can be used in the above range is the power sources for such as electric vehicles, parallel hybrid electric vehicles, electric power storage systems, elevators, electric tools, and the like.

The lithium secondary battery of the present invention is featured in obtaining an input density in the range of 200 W/kg–1300 W/kg per set of batteries. Furthermore, the lithium secondary battery of the present invention is featured in obtaining an output density in the range of 360 W/kg–2520 W/kg per set of batteries. The battery can be used in the same range as the output density. The power source which can be used in the above range is the power sources for such as electric vehicles, parallel hybrid electric vehicles, electric power storage systems, elevators, electric tools, and the like.

The lithium secondary battery of the present invention is featured in obtaining an input density in the range of 300 W/kg–1800 W/kg per unit battery, and 200 W/kg–1300 W/kg per set of batteries, at a temperature in the range from −10° C. to 50° C. The battery can be used in the same range as the above. The power source which can be used in the above range is the power sources for such as electric vehicles, parallel hybrid electric vehicles, electric power storage systems, elevators, electric tools, and the like.

The lithium secondary battery of the present invention is featured in obtaining an input density in the range of 500 W/kg–3500 W/kg per unit battery, and 360 W/kg–2520 W/kg per set of batteries, at a temperature in the range from −10° C. to 50° C. The battery can be used in the same range as the above. The power source which can be used in the above range is the power sources for such as electric vehicles, parallel hybrid electric vehicles, electric power storage systems, elevators, electric tools, and the like.

A method of manufacturing the positive electrode active material of the present invention is featured in comprising the steps of: mixing manganese dioxide with lithium carbonate by a designated ratio, calcining preliminarily the mixture at a temperature in the range of 500° C.–650° C. in air, calcining again the mixture at a temperature in the range of 800° C.–850° C. in air for more than 20 hours, and cooling the mixture by a cooling velocity slower than 2° C./minute. The positive electrode active material obtained by the method explained above has a high crystallinity, a significant grain growth, and preferable long life characteristics even at a high temperature.

The lithium secondary battery comprising the positive electrode of the present invention and the negative electrode has a cycle life of more than 1000 cycles at a temperature higher than 50° C., and high input characteristics and output characteristics at a temperature in the range from −10° C. to 50° C. Therefore, the lithium secondary battery comprising the positive electrode of the present invention and the negative electrode can be applied to the power sources for such as electric vehicles, parallel hybrid electric vehicles, electric power storage systems, elevators, electric tools, and the like, in particular, to the power sources which requires power assistance.

In accordance with the present invention, the lithium secondary battery applicable to industrial batteries, which require a cycle life of more than 1000 cycles at a temperature higher than 50° C., can be obtained.

Operations of the lithium secondary battery is explained, hereinafter.

In order to extend the charging—discharging cycle life at a high temperature, it is necessary to suppress disintegration of crystalline structure accompanied with the charging-discharging reaction by increasing the stability of the positive electrode active material. The disintegration of crystalline structure accompanied with the charging-discharging reaction has two factors, the one is a mechanical disintegration caused by expansion and shrinkage of the lattice at the charging and discharging operation, and the other is a chemical disintegration caused by eluting tetravalent Mn generated during the charging operation by forming an organic complex with the organic solvent in the electrolyte.

In accordance with the positive electrode active material, a material having a large Li/Mn ratio is used. Accordingly, the ratio of $Mn^{4+}$ ions having a smaller ion diameter in comparison with $Mn^{3+}$ ions is increased relatively, and lattice deformation can be decreased by suppressing a Jahn-Teller unstability of $Mn^{3+}$ ions. Therefore, both the mechanical disintegration and the chemical disintegration can be suppressed. For instance, when Li/Mn=0.50, in accordance with the chemical formula of $LiMn_2O_4$, an average valence of Mn ion is 3.5 in consideration of the neutral condition of its electric charge, that is, the number of $Mn^{3+}$ ions is equal to the number of $Mn^{4+}$ ions. When Li/Mn=0.58, an average valence of Mn ion calculated from the chemical formula of $Li_{1+x}Mn_{2-x}O_4$ becomes+3.63. It means that the ratio of $Mn^{4+}$ ions is increased relatively.

At this time, the lattice constant is smaller than the lattice constant of the former. Accordingly, the amount of expansion and shrinkage during the charging and discharging is decreased, and the mechanical disintegration can be suppressed. If the valence of Mn comes to close to tetravalent, lithium ions which can not be deintercalated as much remain in the crystalline structure, and support the crystalline structure as operating as supporting poles. Accordingly, both the mechanical disintegration and the chemical disintegration can be suppressed.

Because the positive electrode active material of the present invention has a high crystallinity and significant grain growth, the stability of the crystal is remarkable, and both the mechanical disintegration and the chemical disintegration can be suppressed.

However, even if the positive electrode active material of the present invention is used, the elution of Mn to a certain extent can not be avoided depending on the temperature condition of the charging and discharging operations, although it may not cause the chemical disintegration. The problem caused by elution of Mn is the portion where the eluted Mn is precipitated. If the eluted Mn is precipitated on the negative electrode primarily, the negative electrode capacity is decreased, and the cycle life is shortened. The portions of precipitating Mn on the negative electrode can be decreased by increasing the density of the negative electrode, or the true density of the carbon, and decreasing the capacity can be suppressed.

As the material of the negative electrode for forming the battery, the material including amorphous carbon as the negative electrode must be used, in order to obtain industrial batteries of long life. When the negative electrode, which does not include amorphous carbon therein, is used, the cycle life is short, and the negative electrode can not be applied to industrial batteries, which require a cycle life of at least 1000 cycles even at a temperature higher than 50° C. When negative electrodes made of conventional carbon other than the amorphous carbon are used, the organic solvent used as the electrolyte is readily decomposed at a temperature higher than 50° C. to form carbon dioxide gas, hydrocarbons, lithium alkoxides, and others. In accordance with the amorphous carbon, such decomposition of the electrolyte is relatively less in comparison with other carbon materials, and the life at the high temperature is long.

As the carbon material for forming the battery, the carbon material having a crystalline thickness Lc in an optimum range must be used, in order to improve the output characteristics and the output characteristics. If the Lc is too large, or too small, it has undesirable effects such as decreasing the number of the intercalation-deintercalation sites, generating a directivity, decreasing the intercalating and deintercalating velocities, and others.

In accordance with the lithium secondary battery of the present invention, high input characteristics and output characteristics can be obtained by combining the positive electrode with the negative electrode of the present invention. Furthermore, in accordance with the lithium secondary battery of the present invention, high input characteristics and output characteristics can be obtained even if a set of the batteries is made up with it.

DETAILED DESCRIPTION OF THE PREFERRED EMBODIMENTS

Hereinafter, details of the present invention is explained referring to practical embodiments. However, the present invention is not restricted by these embodiments as far as within the scope of the present invention.

Embodiment 1

The characteristics of the positive electrode active material was evaluated.

First, the method of manufacturing the positive electrode is explained hereinafter. A mixture was prepared by mixing the positive electrode active material 90% by weight, polyvinylidene fluoride 4% by weight as a binder, and graphite 6% by weight as an electric conductor. After kneading for 30 minutes with a kneader, the mixture was applied onto both planes of an aluminum foil of 20 microns thick.

Amorphous carbon powder was used for the negative electrode. A mixture was prepared by mixing the amorphous carbon powder 87% by weight, acetylene black 6% by weight as an electric conductor, and polyvinylidene fluoride 7% by weight as a binder. After kneading for 30 minutes with a kneader, the mixture was applied onto both planes of a copper foil of 10 microns thick. The positive electrode and the negative electrode were formed respectively by pressing and drawing, welding terminals by spot welding, and drying in vacuum at 150° C. for 5 hours.

The positive electrode and the negative electrode were laminated via a separator made of fine porous polypropylene, wound in a spiral shape, and inserted into a battery can made of stainless steel. The negative electrode terminal was welded to the battery can, and the positive electrode terminal was welded to the lid of the battery can. The electrolyte was prepared by dissolving 1 mole of $LiPF_6$ into one liter of a solvent prepared by mixing ethylene carbonate and diethyl carbonate. The electrolyte was poured into the battery can. A cylindrical battery of 800 mAh was prepared by caulking the lid onto the battery can. The cycles of charging the battery with constant voltage and constant current of 800 mA, 4.2 V at an environ temperature of 50° C. for 7 hours, and then, discharging the battery with 800 mA to 2.8 V were repeated.

Figure 1:
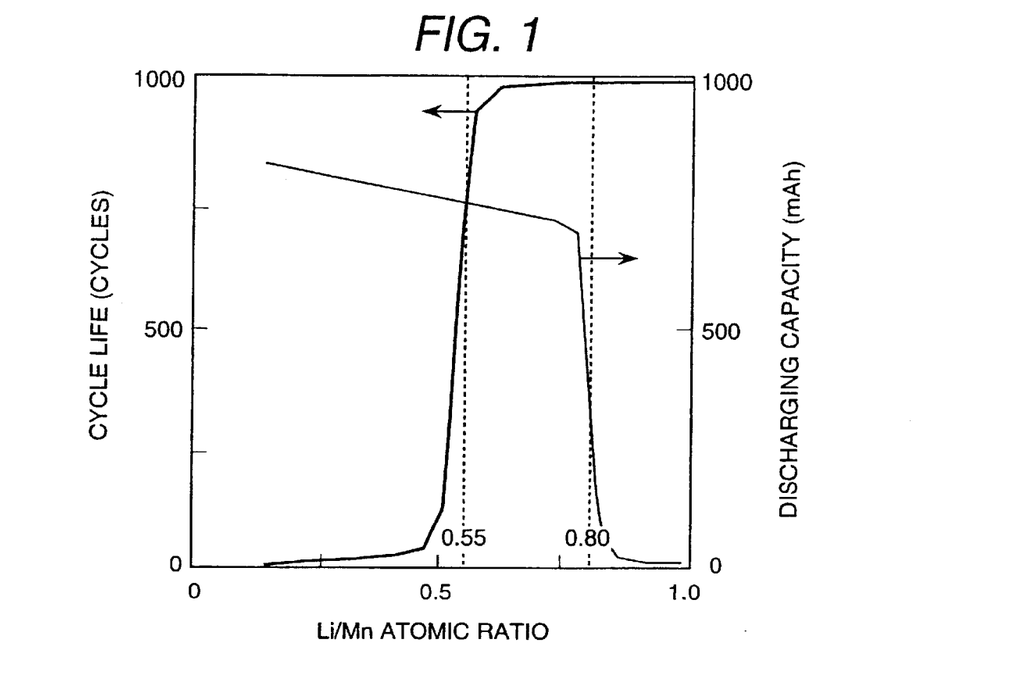
FIG. 1 is a graph indicating the relationship between the cycle life of lithium battery and the atomic ratio of Li/Mn of an embodiment of the present invention.

FIG. 1 is a graph indicating the relationship among the cycle life, the Li/Mn ratio in the positive electrode active material, and the discharging capacity. The other conditions are within the optimum range of the present invention. In accordance with FIG. 1, it is revealed that both the cycle life and the discharging capacity indicate preferable characteristics with the Li/Mn ratio in the range equal to or larger than 0.55 and equal to or smaller than 0.8.

In accordance with a single battery, the input density was in the range of 300 W/kg–1800 W/kg, and the output density was in the range of 500 W/kg–3500 W/kg at a temperature in the range from −10° C. to 50° C. with the depth of discharge in the range of 30%–80%.

In a case of a set of the batteries, wherein 96 batteries were connected in series, the input density was in the range of 200 W/kg–1300 W/kg, and the output density was in the range of 360 W/kg–2520 W/kg at a temperature in the range from −10° C. to 50° C. with the depth of discharge in the range of 30%–80%.

Embodiment 2

Figure 2:
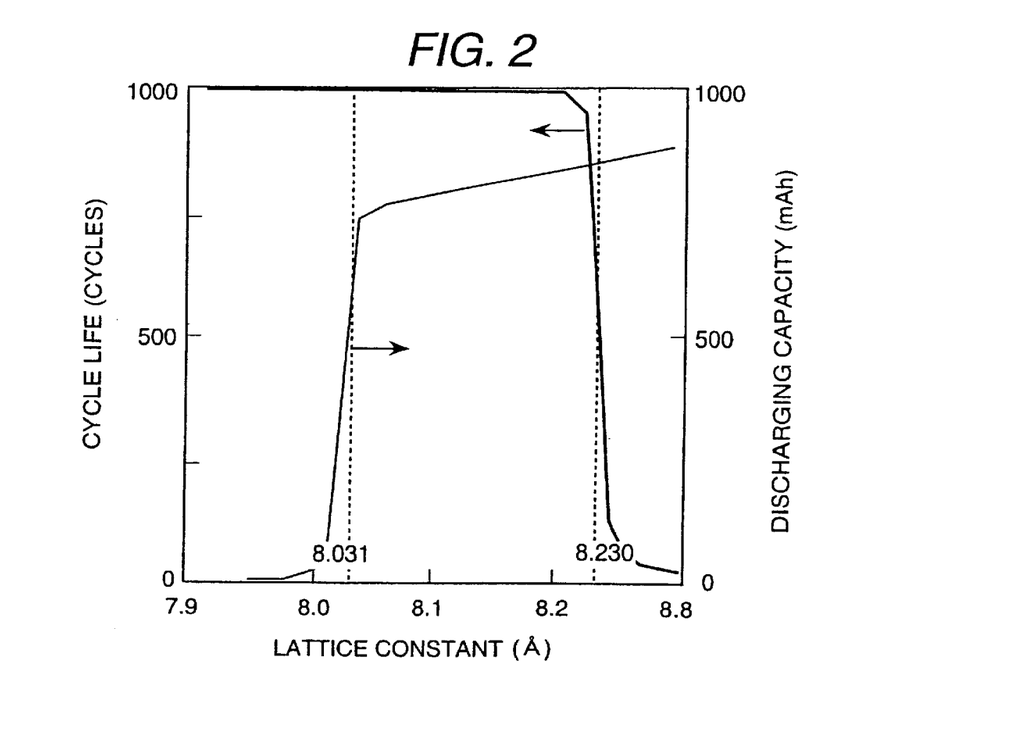
FIG. 2 is a graph indicating the relationship between the cycle life of lithium battery and the lattice constant of an embodiment of the present invention.

The battery characteristics were evaluated in the same manner as the embodiment 1. The lattice constant of the positive electrode active material was measured by x-ray analysis, and the lattice constant of spinel type cubic crystal was obtained by the least square method. FIG. 2 indicates the relationship among the lattice constant of the positive electrode active material, the cycle life, and the discharging capacity. The other conditions are within the optimum range of the present invention. In accordance with FIG. 2, it is revealed that both the cycle life and the discharging capacity are preferable with lattice constant in the range of larger than 8.031 Å and smaller than 8.230 Å.

In accordance with a single battery, the input density was in the range of 300 W/kg–1800 W/kg, and the output density was in the range of 500 W/kg–3500 W/kg at a temperature in the range from −10° C. to 50° C. with the depth of discharge in the range of 30%–80%.

In a case of a set of the batteries, wherein 96 batteries were connected in series, the input density was in the range of 200 W/kg–1300 W/kg, and the output density was in the range of 360 W/kg–2520 W/kg at a temperature in the range from −10° C. to 50° C. with the depth of discharge in the range of 30%–80%.

Embodiment 3

Figure 3:
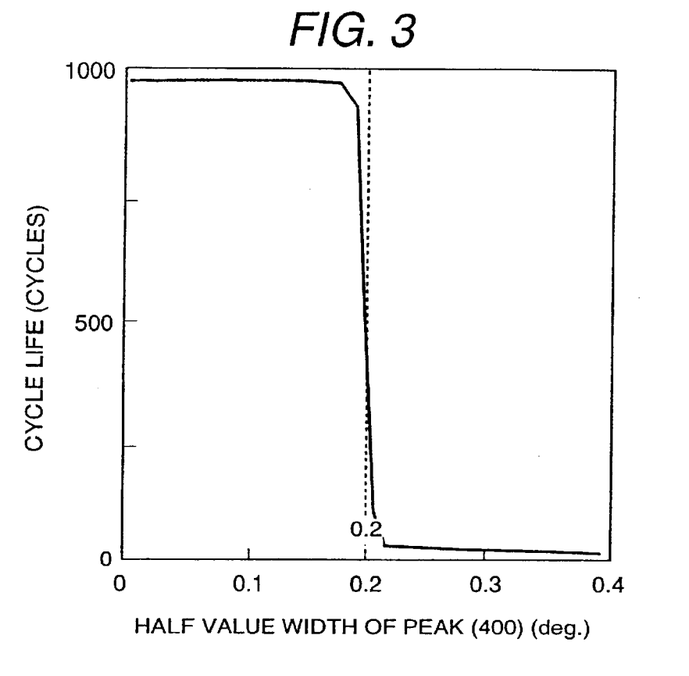
FIG. 3 is a graph indicating the relationship between the cycle life of lithium battery and the half value width of peak of an embodiment of the present invention.

The battery characteristics were evaluated in the same manner as the embodiment 1. The lattice constant of the positive electrode active material was measured by x-ray analysis of the peak (400) using a $CuK_\alpha$ x-ray source with a slit width of DS=SS=0.5, RS=0.15. FIG. 3 indicates the relationship between the cycle life of lithium battery and the half value width of peak (400). The other conditions are within the optimum range of the present invention. In accordance with FIG. 3, it is revealed that the cycle life is preferable with the half value width of the peak (400) in the range smaller than 0.2 degrees.

In accordance with a single battery, the input density was in the range of 300 W/kg–1800 W/kg, and the output density was in the range of 500 W/kg–3500 W/kg at a temperature in the range from −10° C. to 50° C. with the depth of discharge in the range of 30%–80%.

In a case of a set of the batteries, wherein 96 batteries were connected in series, the input density was in the range of 200 W/kg–1300 W/kg, and the output density was in the range of 360 W/kg–2520 W/kg at a temperature in the range from −10° C. to 50° C. with the depth of discharge in the range of 30%–80%.

Embodiment 4

Figure 4:
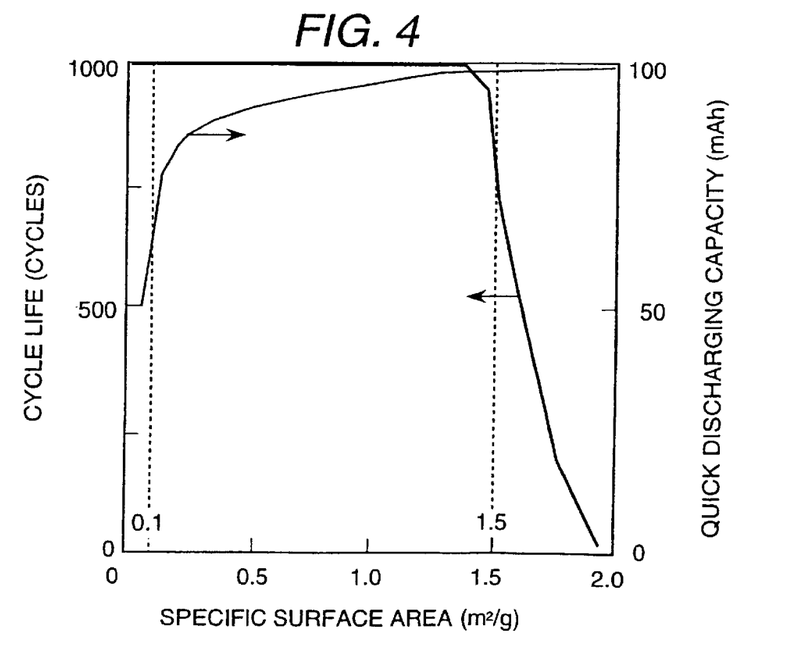
FIG. 4 is a graph indicating the relationship between the cycle life of the lithium battery and the specific surface area of an embodiment of the present invention.

The cycle life characteristics were evaluated by preparing the battery in the same manner as the embodiment 1. The quick discharging efficiency was determined as the ratio of charging capacity to the discharging capacity, when charging the battery with a constant current and constant voltage of 800 mA, 4.2 V, for 7 hours at an environmental temperature of 20° C., and discharging the battery with 1600 mA to 2.8 V. FIG. 4 indicates the relationship among the specific surface area of the secondary particles of the positive electrode active material, the cycle life, and quick discharging efficiency. The other conditions are within the optimum range of the present invention. In accordance with FIG. 4, it is revealed that both the cycle life and the quick discharging efficiency are preferable with the specific surface area in the range of larger than 0.1 $m^2$/g and smaller than 1.5 $m^2$/g.

In accordance with a single battery, the input density was in the range of 300 W/kg–1800 W/kg, and the output density was in the range of 500 W/kg–3500 W/kg at a temperature in the range from −10° C. to 50° C. with the depth of discharge in the range of 30%–80%.

In a case of a set of the batteries, wherein 96 batteries were connected in series, the input density was in the range of 200 W/kg–1300 W/kg, and the output density was in the range of 360 W/kg–2520 W/kg at a temperature in the range from −10° C. to 50° C. with the depth of discharge in the range of 30%–80%.

Embodiment 5

Figure 5:
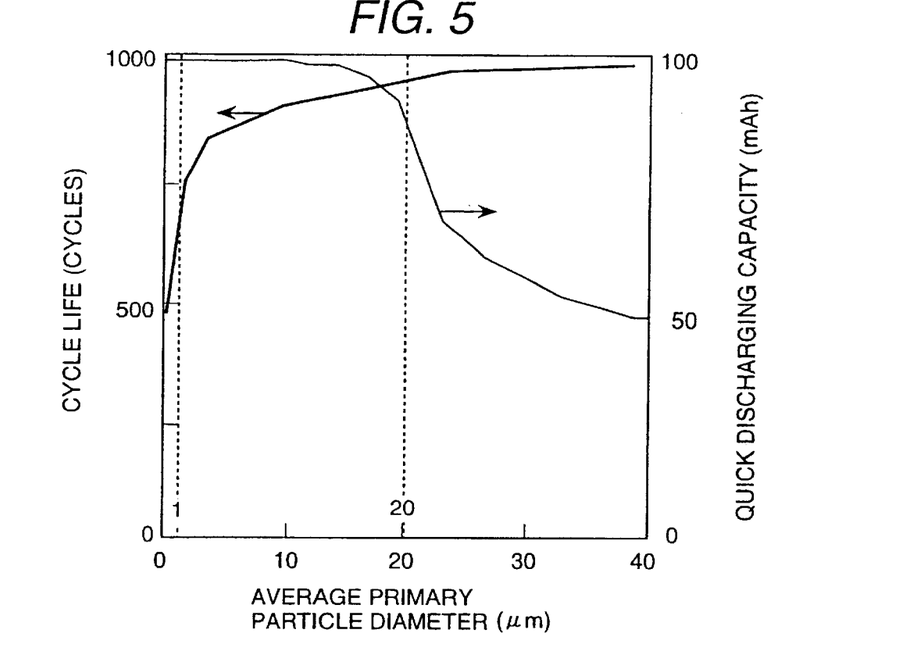
FIG. 5 is a graph indicating the relationship between the cycle life of the lithium battery and the average primary particle diameter of an embodiment of the present invention.

The battery characteristics were evaluated by preparing the battery in the same manner as the embodiments 1 and 4. FIG. 5 indicates the relationship among the particle diameter of average primary particles of the positive electrode active material, the cycle life, and quick discharging efficiency. The other conditions are within the optimum range of the present invention. In accordance with FIG. 5, it is revealed that both the cycle life and the quick discharging efficiency are preferable with the particle diameter of average primary particles of the positive electrode active material in the range of larger than 1 $\mu$m and smaller than 20 $\mu$m.

In accordance with a single battery, the input density was in the range of 300 W/kg–1800 W/kg, and the output density was in the range of 500 W/kg–3500 W/kg at a temperature in the range from −10° C. to 50° C. with the depth of discharge in the range of 30%–80%.

In a case of a set of the batteries, wherein 96 batteries were connected in series, the input density was in the range of 200 W/kg–1300 W/kg, and the output density was in the range of 360 W/kg–2520 W/kg at a temperature in the range from −10° C. to 50° C. with the depth of discharge in the range of 30%–80%.

Embodiment 6

Figure 6:
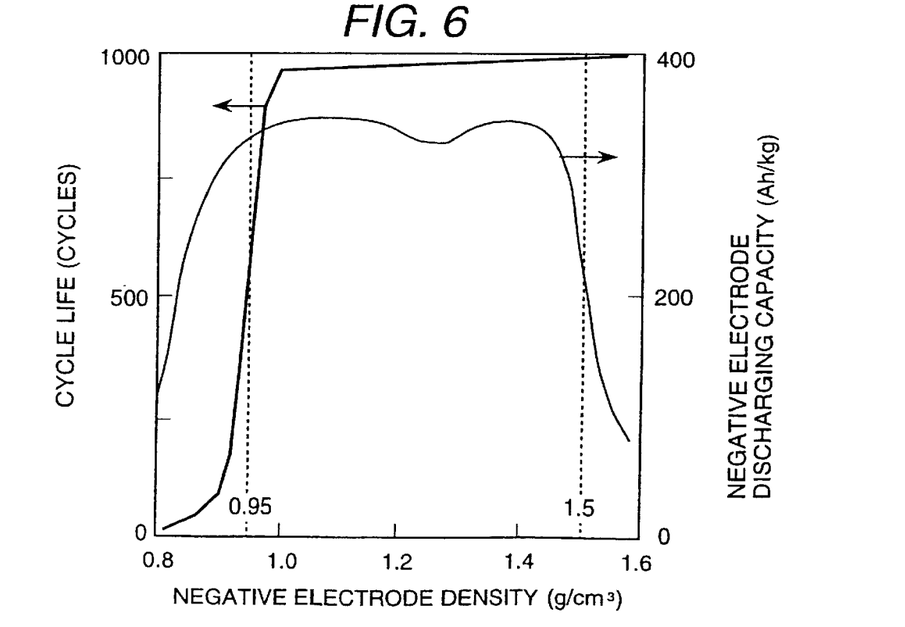
FIG. 6 is a graph indicating the relationship between the cycle life of the lithium battery and the negative electrode density of an embodiment of the present invention.

The cycle characteristics were evaluated by preparing the battery in the same manner as the embodiment 1. Regarding the negative electrode discharging capacity, the capacity of the single negative electrode was evaluated using Li metal as an opposing electrode. FIG. 6 indicates the relationship among the negative electrode density, the cycle life, and the negative electrode discharging capacity. The other conditions are within the optimum range of the present invention. In accordance with FIG. 6, it is revealed that both the cycle life and the negative electrode discharging capacity are preferable with the negative electrode density in the range of larger than 0.95 g/$cm^3$ and smaller than 1.5 g/$cm^3$.

In accordance with a single battery, the input density was in the range of 300 W/kg–1800 W/kg, and the output density was in the range of 500 W/kg–3500 W/kg at a temperature in the range from −10° C. to 50° C. with the depth of discharge in the range of 30%–80%.

In a case of a set of the batteries, wherein 96 batteries were connected in series, the input density was in the range of 200 W/kg–1300 W/kg, and the output density was in the range of 360 W/kg–2520 W/kg at a temperature in the range from −10° C. to 50° C. with the depth of discharge in the range of 30%–80%.

Embodiment 7

The synthetic method of the positive electrode material of the present invention is explained hereinafter. A raw material was prepared by mixing electrolytic manganese dioxide and lithium carbonate to make the Li/Mn ratio 0.62. The raw material was calcined at 615° C. for 15 hours, then, the raw material was mixed again, and sintered at 825° C. for 30 hours. The calcination is an indispensable operation for obtaining preferable cycle life by increasing the homogeneity and crystallinity of the material. The raw material was cooled by a cooling velocity of 1° C./minute after sintering.

Figure 7:
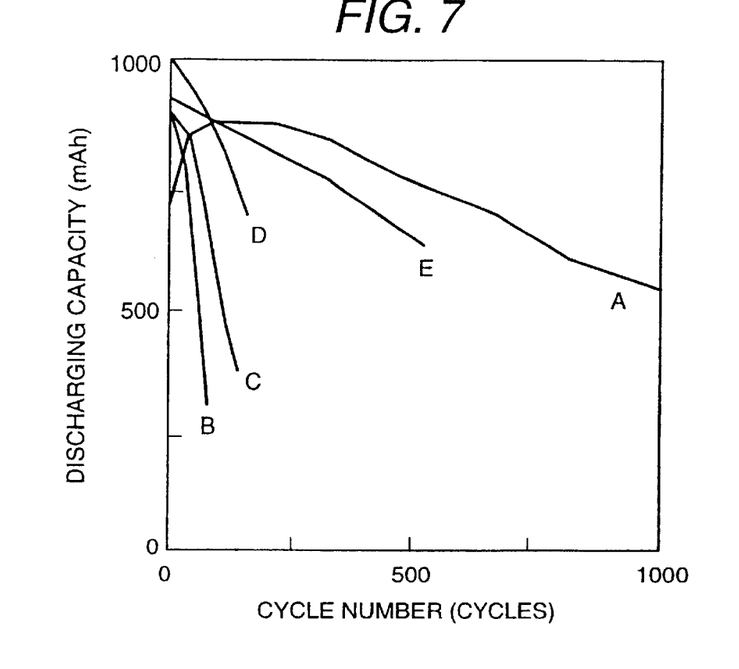
FIG. 7 is a graph indicating the relationship between the cycle life of the lithium battery and the discharge capacity of an embodiment of the present invention.

The powder x-ray diffraction of the positive electrode material obtained in the manner above was measured using a $CuK_\alpha$ x-ray source, and it was confirmed that the material was spinel type crystalline structure containing no other phase. The lattice constant at this time was 8.211 Å, and the half value width of the peak (400) was 0.09 degrees. Furthermore, it was confirmed that the average primary particle diameter was 3.1 μm, and the specific surface area of the secondary particles was 0.32 m²/g. Amorphous carbon was used as the negative electrode, and its density was 1.05 g/cm³. A battery was manufactured in the same manner as the embodiment 1, and its cycle characteristics were evaluated in an environmental temperature of 50° C. In accordance with the curve A in FIG. 7, it was confirmed that the cycle life more than 1000 cycles could be obtained.

In accordance with a single battery, the input density was in the range of 300 W/kg–1800 W/kg, and the output density was in the range of 500 W/kg–3500 W/kg at a temperature in the range from −10° C. to 50° C. with the depth of discharge in the range of 30%–80%.

In a case of a set of the batteries, wherein 96 batteries were connected in series, the input density was in the range of 200 W/kg–1300 W/kg, and the output density was in the range of 360 W/kg–2520 W/kg at a temperature in the range from −10° C. to 50° C. with the depth of discharge in the range of 30%–80%.

COMPARATIVE EXAMPLE 1

A raw material was prepared by mixing electrolytic manganese dioxide and lithium carbonate to make the Li/Mn ratio 0.62, calcining the mixture at 750° C. for 5 hours. Then, the raw material was cooled by a cooling velocity of 5° C./minute after calcining. The lattice constant of the active material obtained at this time was 8.22 Å, and it was revealed that the lattice constant was in the range of the scope of the present invention. However, the half value width of the peak (400) was 0.4 degrees, the average primary particle diameter was 0.6 μm, and the specific surface area of the secondary particles was 2.2 m²/g. Therefore, it was confirmed that these parameters were out of the range of the present invention. With making the density of the negative electrode 1.05 g/cm³ in the range of the present invention, a battery was manufactured in the same manner as the embodiment 1, and its cycle characteristics were evaluated in an environmental temperature of 60° C. In accordance with the curve B in FIG. 7, it was confirmed that the cycle life of only 100 cycles could be obtained.

In accordance with a single battery, the input density was in the range of 150 W/kg–1300 W/kg, and the output density was in the range of 400 W/kg–2800 W/kg at a temperature in the range from −10° C. to 50° C. with the depth of discharge in the range of 30%–80%. It was confirmed that both the input characteristics and the output characteristics were inferior to the battery of the present invention.

In a case of a set of the batteries, wherein 96 batteries were connected in series, the input density was in the range of 90 W/kg–780 W/kg, and the output density was in the range of 240 W/kg–1680 W/kg at a temperature in the range from −10° C. to 50° C. with the depth of discharge in the range of 30%–80%. It was confirmed that both the input characteristics and the output characteristics were inferior to the battery of the present invention.

COMPARATIVE EXAMPLE 2

A raw material was prepared by mixing electrolytic manganese dioxide and lithium carbonate to make the Li/Mn ratio 0.65, calcining the mixture at 635° C. for 15 hours, mixing the calcined material again, and sintering the mixture at 855° C. for 30 hours. Then, the raw material was cooled by a cooling velocity of 1° C./minute after sintering. The lattice constant of the active material obtained at this time was 8.190 Å, the half value width of the peak (400) was 0.08 degrees, the average primary particle diameter was 15 μm, and the specific surface area of the secondary particles was 0.12 m²/g. Therefore, it was confirmed that the positive electrode active material of the present invention was obtained. On the contrary, making the density of the negative electrode 0.91 g/cm³, which was out of the range of the present invention, a battery was manufactured in the same manner as the embodiment 1, and its cycle characteristics were evaluated in an environmental temperature of 60° C. In accordance with the curve C in FIG. 7, it was confirmed that the cycle life of only 50 cycles could be obtained.

In accordance with a single battery, the input density was in the range of 150 W/kg–1300 W/kg, and the output density was in the range of 400 W/kg–2800 W/kg at a temperature in the range from −10° C. to 50° C. with the depth of discharge in the range of 30%–80%. It was confirmed that both the input characteristics and the output characteristics were inferior to the battery of the present invention.

In a case of a set of the batteries, wherein 96 batteries were connected in series, the input density was in the range of 90 W/kg–780 W/kg, and the output density was in the range of 240 W/kg–1680 W/kg at a temperature in the range from −10° C. to 50° C. with the depth of discharge in the range of 30%–80%. It was confirmed that both the input characteristics and the output characteristics were inferior to the battery of the present invention.

COMPARATIVE EXAMPLE 3

A raw material was prepared by mixing electrolytic manganese dioxide and lithium carbonate to make the Li/Mn ratio 0.51, and calcining the mixture at 900° C. for 5 hours. Then, the raw material was cooled by a cooling velocity of 1° C./minute. The lattice constant of the active material obtained at this time was 8.237 Å, which was out of the range of the present invention. However, the half value width of the peak (400) was 0.08 degrees, the average primary particle diameter was 10 μm, and the specific surface area of the secondary particles was 0.15 m²/g. Therefore, it was confirmed that these parameters were in the range of the present invention. The density of the negative electrode was made as 1.05 g/cm³. A battery was manufactured in the same manner as the embodiment 1, and its cycle characteristics were evaluated in an environmental temperature of 60° C. In accordance with the curve D in FIG. 7, it was confirmed that the cycle life of only 150 cycles could be obtained.

In accordance with a single battery, the input density was in the range of 150 W/kg–1300 W/kg, and the output density was in the range of 400 W/kg–2800 W/kg at a temperature in the range from −10° C. to 50° C. with the depth of discharge in the range of 30%–80%. It was confirmed that both the input characteristics and the output characteristics were inferior to the battery of the present invention.

In a case of a set of the batteries, wherein 96 batteries were connected in series, the input density was in the range of 90 W/kg–780 W/kg, and the output density was in the range of 240 W/kg–1680 W/kg at a temperature in the range from −10° C. to 50° C. with the depth of discharge in the range of 30%–80%. It was confirmed that both the input characteristics and the output characteristics were inferior to the battery of the present invention.

COMPARATIVE EXAMPLE 4

A raw material was prepared by mixing electrolytic manganese dioxide and lithium carbonate to make the Li/Mn ratio 0.62, and calcining the mixture at 850° C. for 5 hours. Then, the raw material was cooled by a cooling velocity of 1° C./minute. The lattice constant of the active material obtained at this time was 8.22 Å, the half value width of the peak (400) was 0.1 degrees, and the average primary particle diameter was 2 μm. Therefore, it was confirmed that these parameters were in the range of the present invention. However, the specific surface area of the secondary particles was as large as 1.8 m$^2$/g. The density of the negative electrode was made as 1.05 g/cm$^3$. A battery was manufactured in the same manner as the embodiment 1, and its cycle characteristics were evaluated in an environmental temperature of 60° C. In accordance with the curve E in FIG. 7, it was confirmed that the cycle life of only 500 cycles could be obtained.

In accordance with a single battery, the input density was in the range of 150 W/kg–1300 W/kg, and the output density was in the range of 400 W/kg–2800 W/kg at a temperature in the range from −10° C. to 50° C. with the depth of discharge in the range of 30%–80%. It was confirmed that both the input characteristics and the output characteristics were inferior to the battery of the present invention.

In a case of a set of the batteries, wherein 96 batteries were connected in series, the input density was in the range of 90 W/kg–780 W/kg, and the output density was in the range of 240 W/kg–1680 W/kg at a temperature in the range from −10° C. to 50° C. with the depth of discharge in the range of 30%–80%. It was confirmed that both the input characteristics and the output characteristics were inferior to the battery of the present invention.

Embodiment 8

The lithium secondary battery using the complex oxide of the present invention as the positive electrode has a feature that the charging-discharging efficiency is approximately 100%, and reversibility of the intercalation-deintercalation of lithium ions is preferable in addition to the advantages described above.

Figure 8:
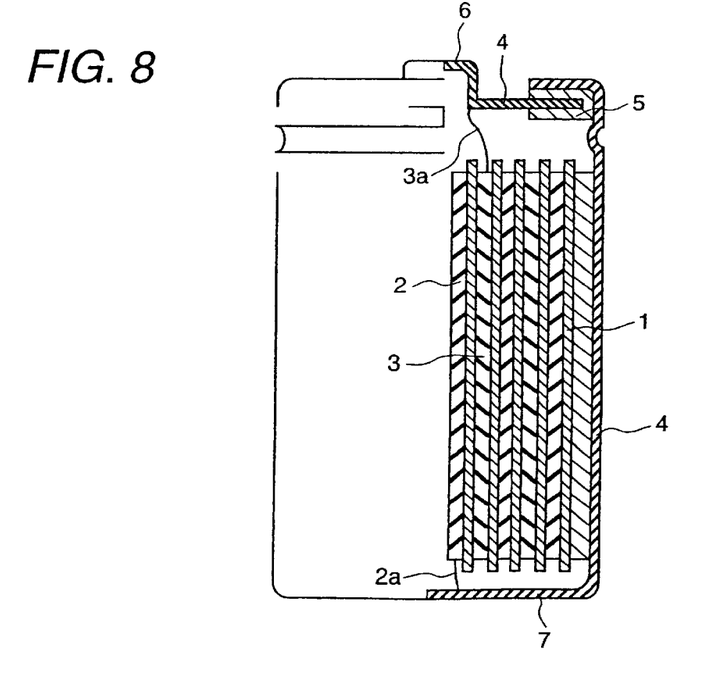
FIG. 8 is a partially sectional side view of the lithium secondary battery of an embodiment of the present invention.

The lithium secondary battery indicated in FIG. 8 is manufactured by laminating the negative electrode 2 and the positive electrode 3 via the separator made of fine porous polypropylene, winding the laminated materials in a spiral shape, and inserting the wound materials into a battery can 4 made of stainless steel (SUS). The negative electrode 2 is connected to the battery can 4 via the negative electrode lead line 2A. The positive electrode 3 is connected to the lid 4, i.e. a metallic member, via the positive electrode lead line 3A. An insulating member 5 is interposed between the lid 4 and the battery can 4, and inside the battery can 4 is sealed. An electrolyte was injected into the battery can 4. The protrusion on the lid is the positive electrode terminal 6, and the portion of the battery can 4 opposite to the protrusion is the negative electrode terminal 7.

Figure 9:
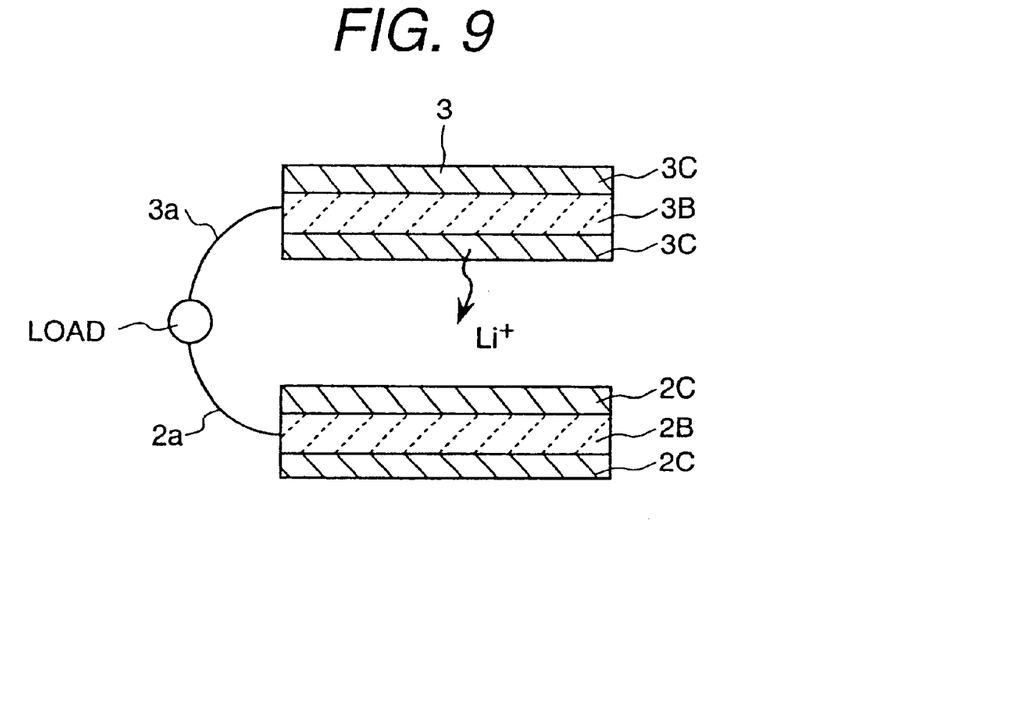
FIG. 9 is a schematic cross sectional view of positive electrode and negative electrode used in the battery shown in FIG. 8.

The electric collector 2B of the negative electrode 2 indicated in FIG. 9 is provided with the carbon layer 2C. The electric collector 3B of the positive electrode 3 is provided with the complex oxide layer 3C including Li and Mn of the present invention. When a current is flowed between the positive electrode and the negative electrode, Li ions are readily transferred from the complex oxide layer 3C to the carbon layer 2C.

Figure 10:
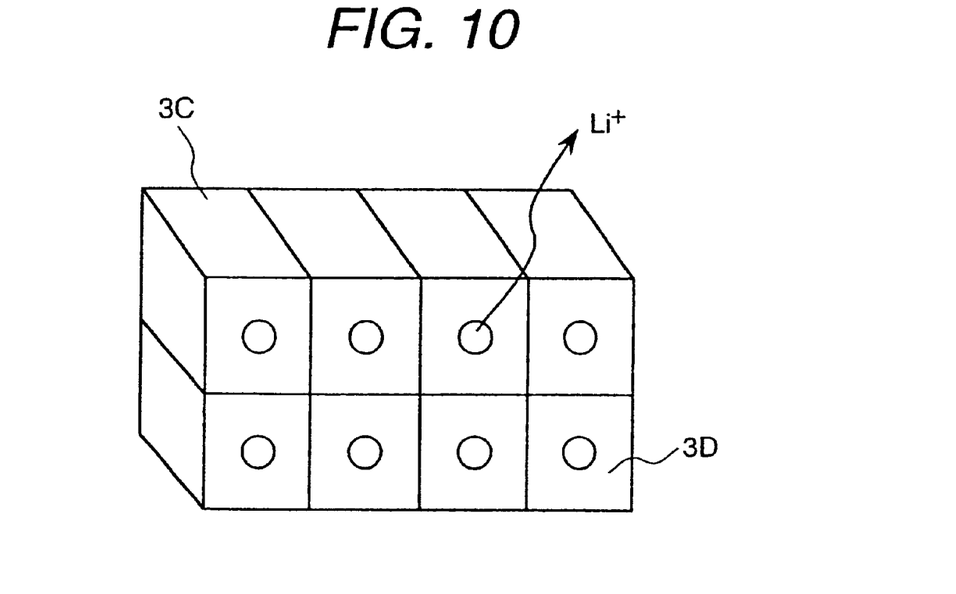
FIG. 10 is a schematic cross sectional view indicating the crystalline structure of the complex oxide layer used in the battery shown in FIG. 8.
Figure 11:
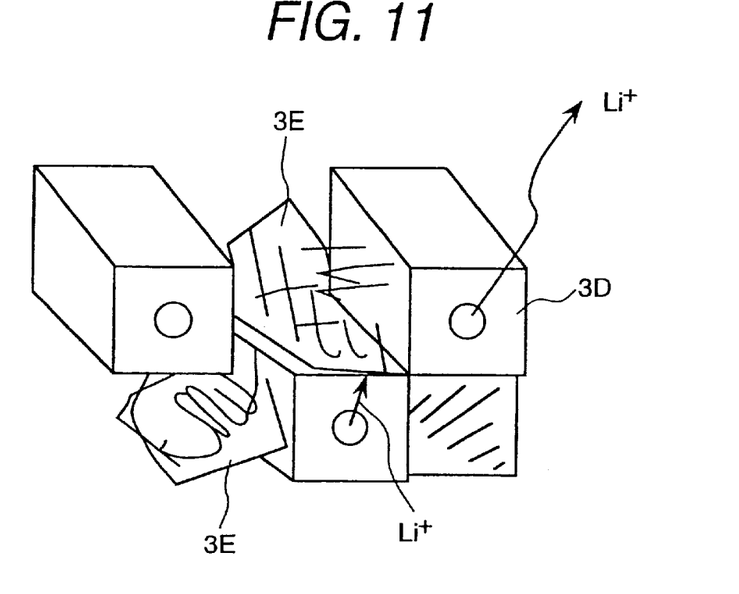
FIG. 11 is a schematic cross sectional view indicating the conventional crystalline structure of the complex oxide layer.
Figure 12:
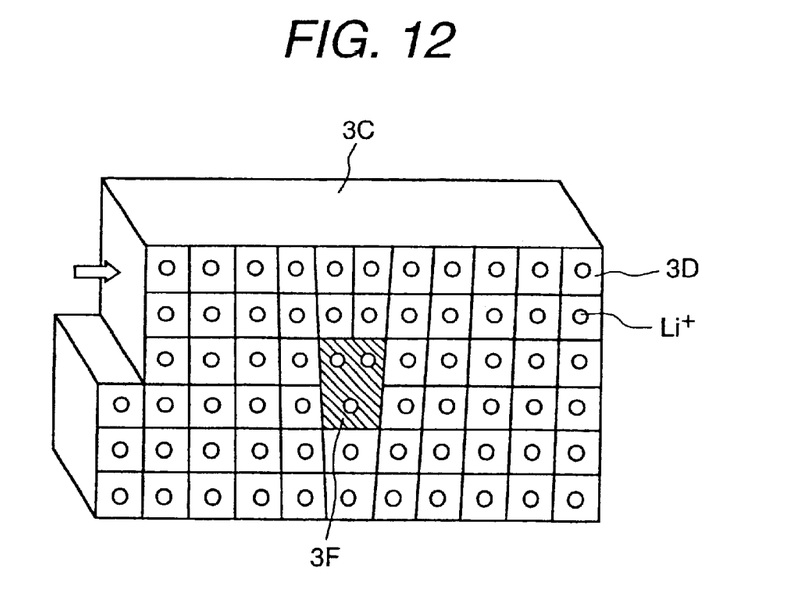
FIG. 12 is a schematic cross sectional view indicating the conventional crystalline structure of the complex oxide layer.
Figure 13:
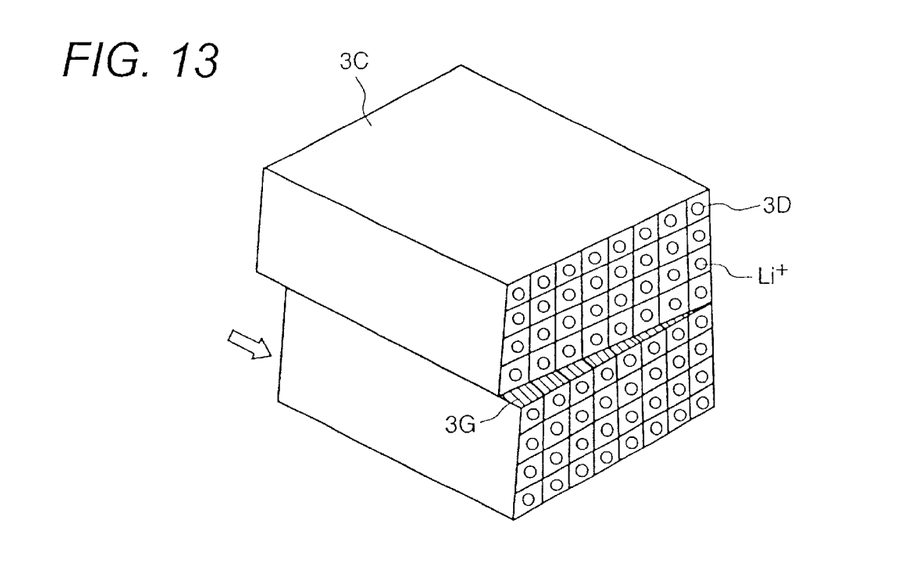
FIG. 13 is a schematic cross sectional view indicating the conventional crystalline structure of the complex oxide layer.

The reason is explained referring to FIG. 10, hereinafter. The complex oxide layer 3C is composed of plural crystalline lattices 3D, which are arranged regularly. When Li ions are released from the crystalline lattice 3D, the Li ions can be diffused to the carbon layer 2C faster than prior art which is described later, because the diffusion is not hindered by the defect 3F, the transition 3G, nor impurities as indicated in FIG. 12 and FIG. 13. In accordance with conventional crystalline lattice 3D indicated in FIG. 11, the release of Li ions is disturbed by the deformed portion 3E, which lacks regularity of the crystalline structure, and Li ions can not be transferred to the carbon layer 2C. Therefore, the discharging efficiency is decreased. The circumstance is same when Li ions are intercalated from the carbon layer 2C into the complex oxide layer 3C.

As explained above, the lithium secondary battery using the complex oxide layer 3C including Li and Mn of the present invention has a preferable reversibility in intercalation-deintercalation of Li, and the charging-discharging efficiency can be maintained approximately at 100%.

Embodiment 9

Figure 14:
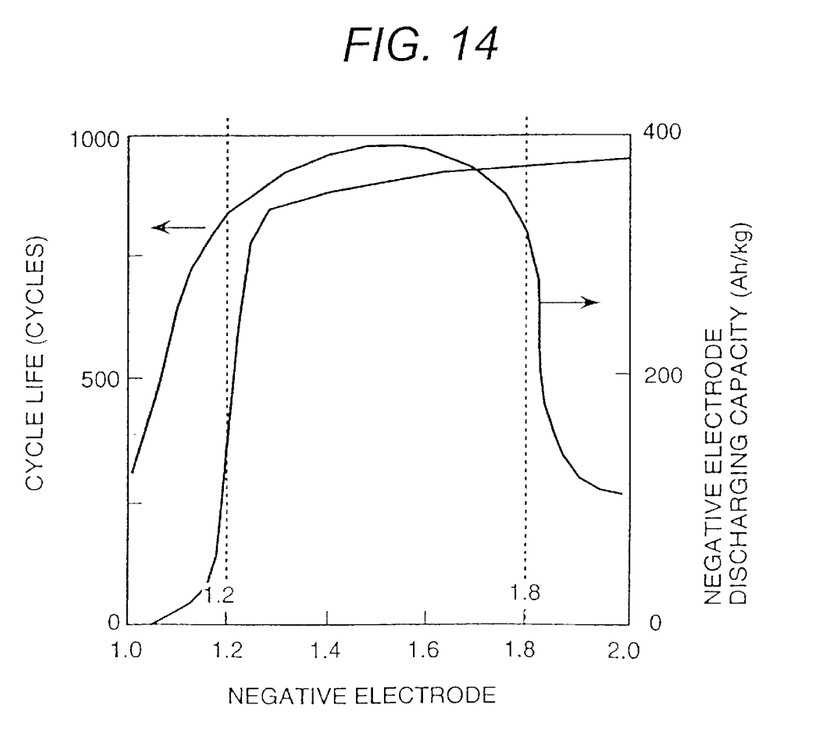
FIG. 14 is a graph indicating the relationship between the cycle life of the lithium battery and the negative electrode true density of an embodiment of the present invention.

A battery was manufactured in the same manner as the embodiment 1, and the cycle characteristics of the battery was evaluated. Regarding the negative electrode discharging capacity, the capacity of the single negative electrode was evaluated using Li metal as an opposing electrode. FIG. 14 indicates the relationship among the negative electrode true density, the cycle life, and the negative electrode discharging capacity. The other conditions are within the optimum range of the present invention. In accordance with FIG. 14, it is revealed that both the cycle life and the negative electrode discharging capacity are preferable with the negative electrode density in the range of larger than 1.2 g/cm$^3$ and smaller than 1.8 g/cm$^3$.

In accordance with a single battery, the input density was in the range of 300 W/kg–1800 W/kg, and the output density was in the range of 500 W/kg–3500 W/kg at a temperature in the range from −10° C. to 50° C. with the depth of discharge in the range of 30%–80%.

In a case of a set of the batteries, wherein 96 batteries were connected in series, the input density was in the range of 200 W/kg–1300 W/kg, and the output density was in the range of 360 W/kg–2520 W/kg at a temperature in the range from −10° C. to 50° C. with the depth of discharge in the range of 30%–80%.

Embodiment 10

A battery was manufactured in the same manner as the embodiment 1, and the relationship among the crystalline thickness of the negative electrode carbon Lc, the input density, and the output density was evaluated. The other conditions are within the optimum range of the present invention. Both the input density and the output density indicate preferable characteristics with the crystalline thickness Lc of the negative electrode carbon in the range of 5 Å–150 Å.

In accordance with a single battery, the input density was in the range of 1000 W/kg–1800 W/kg, and the output density was in the range of 2500 W/kg–3500 W/kg at a temperature in the range from −10° C. to 50° C. with the depth of discharge in the range of 30%–80%.

In a case of a set of the batteries, wherein 96 batteries were connected in series, the input density was in the range of 800 W/kg–1300 W/kg, and the output density was in the range of 2000 W/kg–2520 W/kg at a temperature in the range from −10° C. to 50° C. with the depth of discharge in the range of 30%–80%.

As explained above, in accordance with the present invention, the lithium secondary battery having a long life can be obtained by using the materials having a long life under a high temperature. The lithium secondary battery using the complex oxide including Li and Mn of the present invention can responds to variation in charges, and supplies electric power quickly.

What is claimed is:

1. A lithium secondary battery comprising:

a negative electrode, a non-aqueous electrolyte, and a positive electrode, wherein an active material of said negative electrode comprises amorphous carbon, negative electrode density of which is larger than 0.95 g/cm$^3$, and smaller than 1.5 g/cm$^3$, an active material of said positive electrode comprises a complex oxide material including Li and Mn, which has a spinel type crystalline structure, and a half value width of 2 θ angle of peak (400) in X-ray diffraction pattern smaller than 0.20°, the Li/Mn atomic ratio of said complex oxide is larger than 0.55, and smaller than 0.80, the lattice constant of the spinel crystalline structure of said complex oxide is larger than 8.031 Å and smaller than 8.230 Å, the specific surface area of secondary particles of said complex oxide is larger than 0.10 m$^2$/g and smaller than 1.5 m$^2$/g, and the average particle diameter of primary particles of said complex oxide is larger than 1 μm and smaller than 20 μm.

2. A lithium secondary battery comprising:

a negative electrode, a non-aqueous electrolyte, and a positive electrode, wherein an active material of said negative electrode comprises amorphous carbon, true density of which is in the range of 1.2 g/cm$^3$–1.8 g/cm$^3$, an active material of said positive electrode comprises a complex oxide material including Li and Mn, which has a spinel type crystalline structure, and a half value width of 2θ angle of peak (400) in X-ray diffraction pattern smaller than 0.20°, the Li/Mn atomic ratio of said complex oxide is larger than 0.55, and smaller than 0.80, the lattice constant of the spinel crystalline structure of said complex oxide is larger than 8.031 Å and smaller than 8.230 Å, the specific surface area of secondary particles of said complex oxide is larger than 0.10 m$^2$/g and smaller than 1.5 m$^2$/g, and the average particle diameter of primary particles of said complex oxide is larger than 1 μm and smaller than 20 μm.

3. A lithium secondary battery comprising:

a negative electrode, a non-aqueous electrolyte, and a positive electrode, wherein an active material of said negative electrode comprises amorphous carbon, the crystalline thickness Lc of which is in the range of 5 Å–150 Å, an active material of said positive electrode comprises a complex oxide material including Li and Mn, which has a spinel type crystalline structure, and a half value width of 2 θ angle of peak (400) in X-ray diffraction pattern smaller than 0.20°, the Li/Mn atomic ratio of said complex oxide is larger than 0.55, and smaller than 0.80, the lattice constant of the spinel crystalline structure of said complex oxide is larger than 8.031 Å and smaller than 8.230 Å, the specific surface area of secondary particles of said complex oxide is larger than 0.10 m$^2$/g and smaller than 1.5 m$^2$/g, and the average particle diameter of primary particles of said complex oxide is larger than 1 μm and smaller than 20 μm.

4. A lithium secondary battery as claimed in any one of claims 1–3, wherein an input density of single battery is in the range of 300 W/kg–1800 W/kg.

5. A lithium secondary battery as claimed in any one of claims 1–3, wherein an output density of single battery is in the range of 500 W/kg–3500 W/kg.

6. A lithium secondary battery as claimed in any one of claims 1–3, wherein an input density of a set of batteries is in the range of 200 W/kg–1300 W/kg.

7. A lithium secondary battery as claimed in any one of claims 1–3, wherein an output density of a set of batteries is in the range of 360 W/kg–2520 W/kg.

8. A lithium secondary battery having an input density as claimed in claim 4 or claim 6 at an operation temperature in the range from −10° C. to 50° C.

9. A lithium secondary battery having an input density as claimed in claim 5 or claim 7 at an operation temperature in the range from −10° C. to 50° C.

* * * * *